(12) United States Patent
Dinwiddie et al.

(10) Patent No.: US 11,322,979 B1
(45) Date of Patent: May 3, 2022

(54) POWER RECEIVER FOR EXTRACTING ENERGY FROM THE EARTH'S HYDROSPHERE

(71) Applicant: Earth Energies, Inc., Alpharetta, GA (US)

(72) Inventors: John Dinwiddie, Ptitsboro, NC (US); Terry L. Wright, Suwanee, GA (US)

(73) Assignee: EARTH ENERGIES, INC., John's Creek, GA (US)

( * ) Notice: Subject to any disclaimer, the term of this patent is extended or adjusted under 35 U.S.C. 154(b) by 0 days.

(21) Appl. No.: 17/110,176

(22) Filed: Dec. 2, 2020

(51) Int. Cl.
*H01F 27/42* (2006.01)
*H01F 37/00* (2006.01)
*H01F 38/00* (2006.01)
*H02J 50/00* (2016.01)
*H02J 7/34* (2006.01)

(52) U.S. Cl.
CPC ............ *H02J 50/001* (2020.01); *H02J 7/345* (2013.01)

(58) Field of Classification Search
CPC . H02J 5/005; H02J 7/025; H02J 17/00; H01F 38/14; B60L 11/182
USPC .......................................................... 307/104
See application file for complete search history.

(56) References Cited

U.S. PATENT DOCUMENTS

2017/0117714 A1* 4/2017 Dinwiddie ................ H02J 4/00

* cited by examiner

*Primary Examiner* — Quan Tra
(74) *Attorney, Agent, or Firm* — Coats & Bennett, PLLC

(57) ABSTRACT

The hydrosphere provides a natural wireless electric grid transporting energy through with a 7.5 Hz to 300 Hz bandpass. The hydrosphere grid eliminates the need for transmission lines and distribution lines operating at 50 Hz or 60 Hz worldwide. Global lightning return stroke current is sourced by the hydrosphere triggered by high voltage storm cloud conductivity. A power receiver extracts power from the Earth's hydrosphere, which serves as a current source for the power receiver. Water/moisture in the hydrosphere is conductive to ELF/SLF EM energy and functions as an electromagnetic spherical antenna that conducts broadband electromagnetic energy between 7.5 Hz and about 300 Hz. The power receiver comprises a resonant transformer that is electrically coupled to the earth's hydrosphere. The resonant transformer induces current flow from the Earth's hydrosphere. The power converts energy in ELF/SLF waves to useful form, e.g. 60 Hz AC or DC.

28 Claims, 9 Drawing Sheets

POWER RECEIVER FOR EXTRACTING ENERGY FROM THE EARTH'S HYDROSPHERE

TECHNICAL FIELD

The present invention relates generally to renewable energy, and more particularly to methods and apparatus for extracting energy from the earth's hydrosphere.

BACKGROUND

Around the turn of the 20th century, Nikola Tesla envisioned a World Wireless System for transmission of power and communications. The World Wireless System was based on the idea of using the Earth and its atmosphere as electrical conductors. Tesla claimed that his system would allow "the instantaneous and precise wireless transmission of any kind of signals, messages, characters, to all parts of the world" without wires.

Tesla's vision of a World Wireless System had its origins in Hertz's experiments with electromagnetic waves using induction coil transformers and spark gaps. Tesla's own experiments led to the development of the Tesla coil and the resonant transformer, both of which were used to improve Hertz's wireless transmitter, but Tesla was primarily interested in power transmission. Tesla initially experimented with the idea of transmitting energy through both the earth and the air strata, but his research eventually focused on the idea of using the Earth as a conductor. Tesla would have been familiar with Samuel Morse's single-wire telegraph, which had been in use since 1837. The single-wire telegraph system used the Earth as a return and contributed minimal resistance if the circuit was more than a few miles in length. Ground conductivity was widely accepted by electricians at the beginning of the electrical age.

On Nov. 2, 1897, Tesla received U.S. Pat. No. 593,138 (the '138 patent) for an electrical transformer, commonly known as a Tesla coil, that he used in a power transmission system. The power transmission system included a transmitter and a receiver connected by a single wire. The transmitter comprised a step up transformer to generate a high voltage current. The receiver comprised a step down transformer connected to electrical lamps and motors. The secondary coils at the transmitter and receiver were connected by a single wire and to an earth ground. An alternator or generator applied electrical impulses to the primary coil to generate a high voltage oscillating current at the transmitter. The high voltage current was transmitted via the single wire to the receiver, where the voltage was lowered and used to power lamps, motors or other equipment.

While working in Colorado Springs, Tesla observed that the Earth was "literally alive with electrical vibrations" and concluded that lightning strikes were evidence that the Earth is a conductor with waves of electromagnetic energy traveling around it. On Mar. 20, 1900, Tesla received U.S. Pat. No 645,576 for a system for transmission of electrical energy through the Earth. The transmission system was the same as the transmission system in the '138 patent except that the single wire connecting the secondary coils at the transmitter and receiver were replaced by two elevated terminals—one at the transmitter and one at the receiver. As described by Tesla, the development of high voltage at the elevated terminals would cause energy to flow by conduction through the Earth from the transmitter to the receiver. At Colorado Springs in 1899, Tesla successfully demonstrated power conduction through the Earth by using this to illuminate a light connected to the receiver.

In 1901, after returning to New York and receiving funding from J. P Morgan, Tesla began work on a large, commercial scale wireless power plant in New York, known as Wardenclyffe, using the Earth as a conductor. Wardenclyffe employed an aerial capacity similar to the transmitter in the '576 Patent with a large radius of curvature to prevent "leakage" of energy. The aerial capacity provided leverage against which to "pump" ground energy. Wardenclyffe was designed to transmit low frequencies through the Earth from a transmitter to a receiver. Tesla was granted U.S. Pat. No. 1,119,732 for the Wardenclyffe transmitter. Unfortunately, J. P. Morgan withdrew funding and Tesla never completed the project so his ideas have never been tested at a commercial scale.

After the Wardenclyffe project Tesla continued to publish his ideas for wireless power transmission. In 1919, an article in "Electrical Experimenter" magazine published by Tesla illustrates a single hand pump and many pressure gauges plugged into the globe. Each pulse of the pump is felt with equal force in the flexible spherical envelope filled with water. Tesla states that "It is practicable to distribute power from a central plant in unlimited amounts." In 1925, Tesla published a drawing of a wireless power system using the Earth surface as a conductor. In this drawing, Tesla illustrates a "ground water shell existing over the entire Earth's surface" that resonated at 60 Hz.

While Tesla's vision of a global wireless power system has yet to be realized, research continues to this day into wireless power transmission. Recently, a New Zealand company called Emrod announced plans to build the world's first commercial wireless power transmission system. Emrod's power transmission technology uses microwaves to transfer power over long distances between a transmitter and a receiver without the use of copper coils. Unlike Tesla's World Wireless System, the wireless power system developed by Emrod relies on radiation through the atmosphere rather than conduction through the Earth for power transfer.

SUMMARY

The present invention relates to a power receiver for extracting power from the Earth's hydrosphere. The hydrosphere is a volume of Earth that contains permanent water (moisture), extending from Earth's surface (i.e., lakes, oceans, seas, rivers swamps) to a depth below which no water (moisture) exists. Water/moisture in the hydrosphere is conductive to ELF/SLF EM energy and functions as an electromagnetic spherical antenna that conducts broadband electromagnetic energy between 7.5 Hz and about 300 Hz. The hydrosphere antenna serves as a current source for the power receiver. The power receiver comprises a resonant transformer that is electrically coupled to the earth's hydrosphere. The power receiver converts energy in ELF/SLF waves to useful form, e.g. 50/60 Hz AC or DC.

A first aspect of the disclosure comprises a power receiver for extracting electrical energy from the earth's hydrosphere. The power receiver comprises a hydrosphere terminal configured for insertion in the hydrosphere and insulated from electrical ground, a resonant transformer connected to hydrosphere terminal, and a driver circuit connected to a primary winding of the resonant transformer to generate a high voltage alternating current in a secondary winding of the resonant transformer to induce current flow from the hydrosphere through the resonant transformer.

A second aspect of the disclosure comprises a power receiver for extracting electrical energy from the earth's hydrosphere. The power receiver comprises a hydrosphere terminal configured for insertion in the hydrosphere and insulated from an electrical ground, a resonant transformer connected to hydrosphere terminal via a spark gap that isolates the resonant transformer from the hydrosphere terminal in a gaseous state and connects the resonant transformer to the hydrosphere terminal in a plasma state, and a driver circuit connected to a primary winding of the resonant transformer to generate a high voltage alternating current in a secondary winding of the resonant transformer to induce an electrical spark across the spark gap.

A third aspect of the disclosure comprises a method of extracting energy from the Earth's hydrosphere. In one embodiment, the method comprises electrically coupling a secondary winding of a resonant transformer to a hydrosphere terminal inserted into the Earth's hydrosphere, electrically insulating the connection between the hydrosphere terminal and resonant transformer from earth ground, applying a drive signal to the resonant transformer to cause the resonant transformer to oscillate, and generating a high voltage in the secondary winding of the resonant transformer to induce the flow of current from the hydrosphere to the resonant circuit.

DETAILED DESCRIPTION

Figure 1:
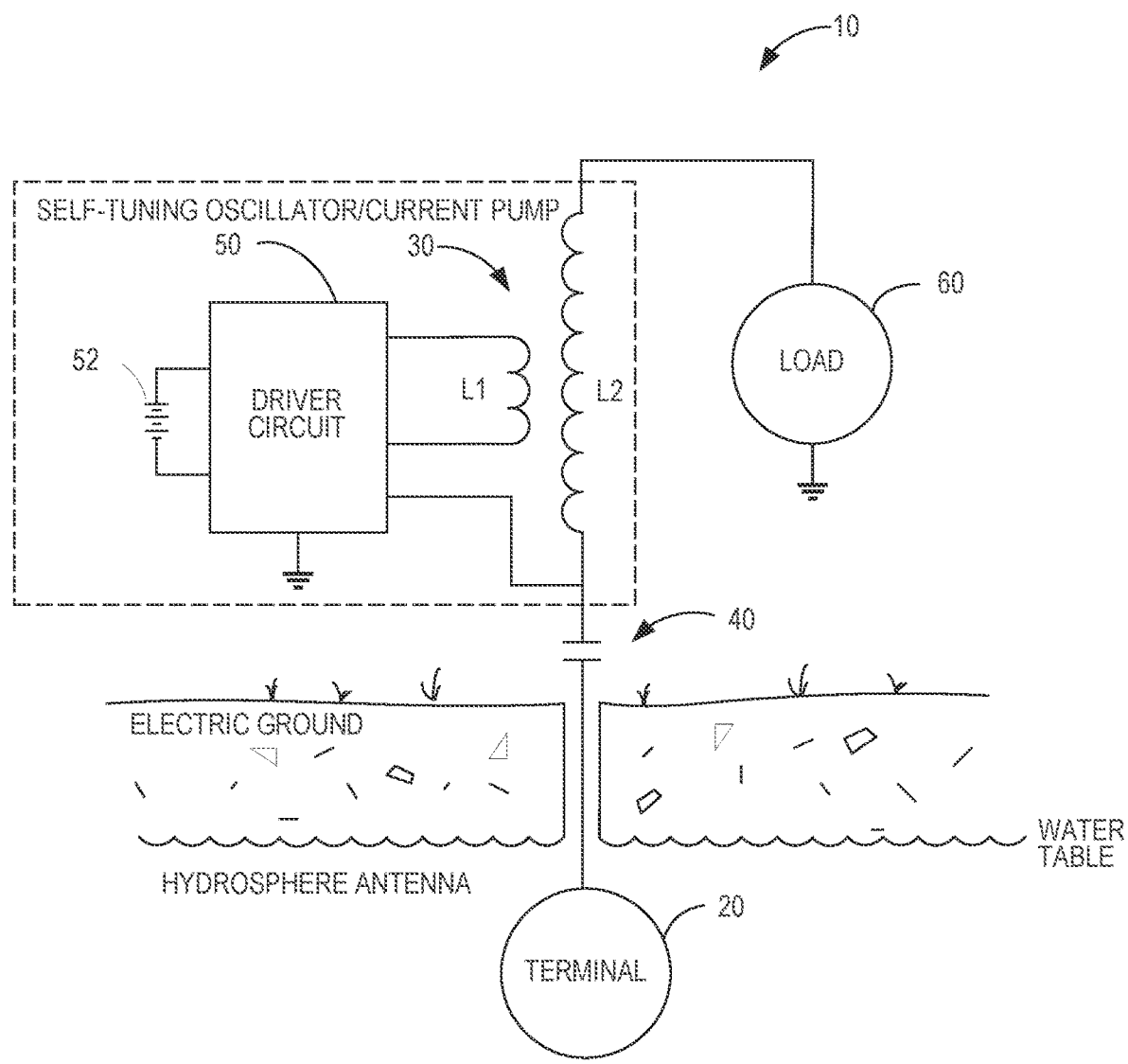
FIG. 1 is a schematic diagram of a power receiver according to a first embodiment.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Referring now to the drawings, a power receiver for extracting energy from the Earth's hydrosphere are illustrated and indicated generally by the numeral 10. Various embodiments of the power receiver 10 are described and similar reference numbers are used throughout the description to indicate similar components.

Figure 2A:
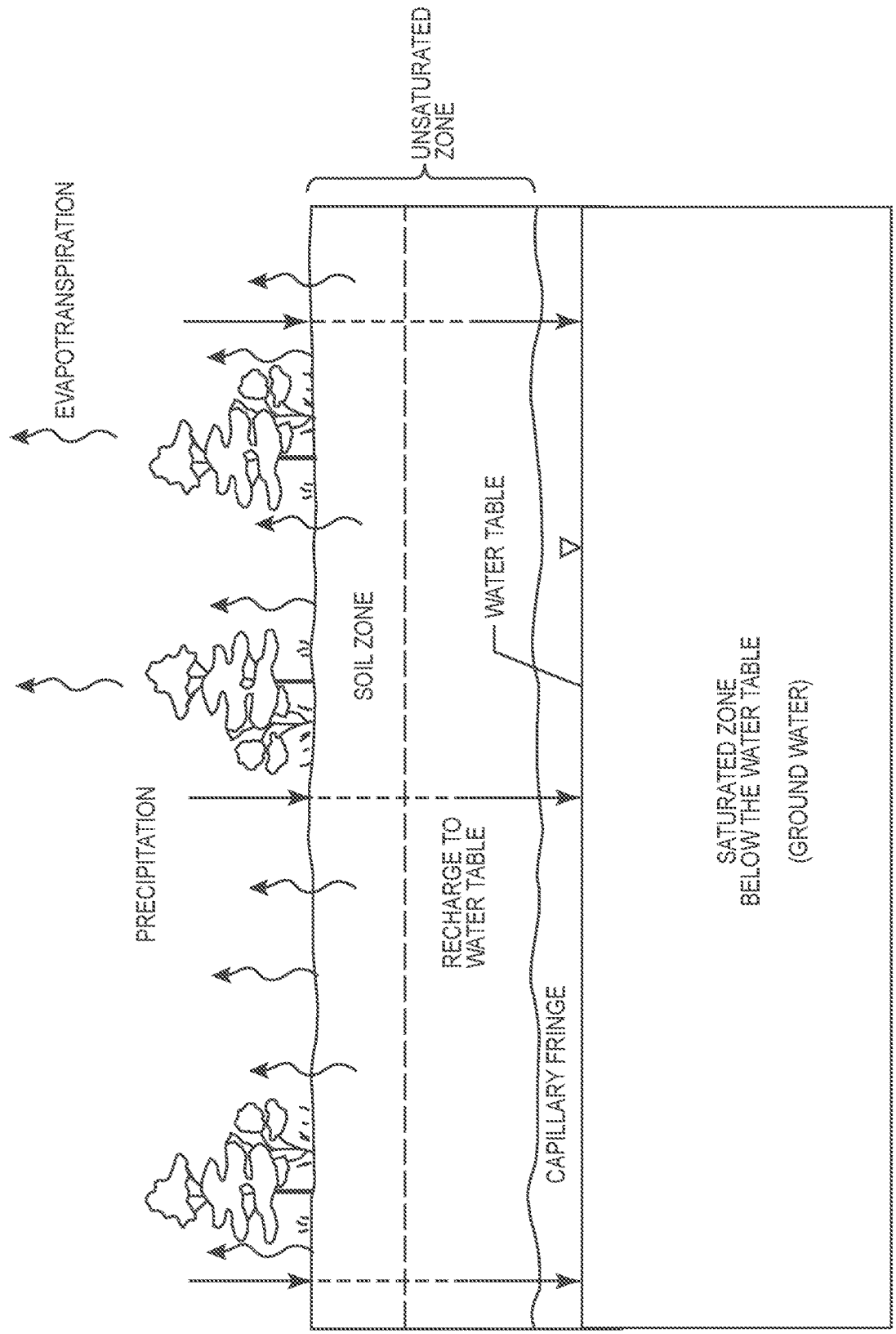
FIGS. 2A and 2B illustrate the Earth's hydrosphere.
Figure 2B:
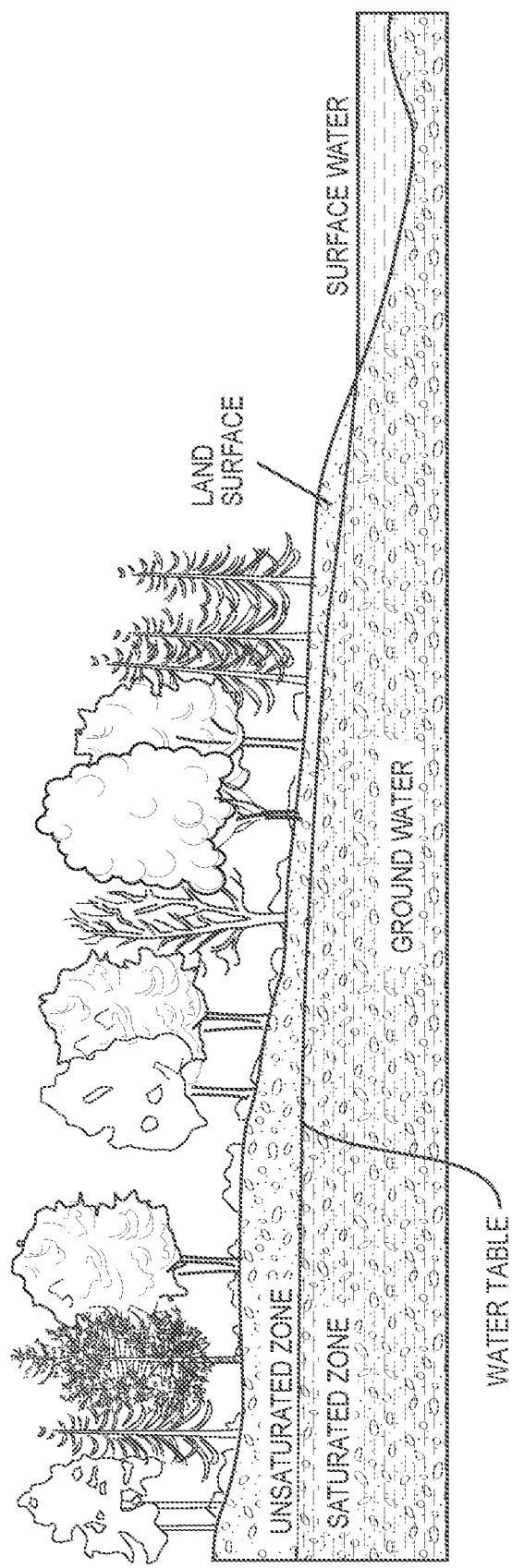

The power receiver 10 converts energy in extremely low frequency (ELF) and super low frequency (SLF) waves to useful form, e.g. 60 Hz AC or DC. The power receiver 10 comprises a resonant circuit that is electrically coupled to the earth's hydrosphere antenna. The hydrosphere is a volume of Earth that contains water. Referring to FIGS. 2A and 2B, the hydrosphere includes surface water (i.e., lakes, oceans, seas, rivers swamps) and groundwater in the saturated zone (i.e., below the water table) beneath the Earth's surface As used herein, the term "hydrosphere" does not include the unsaturated zone near the Earth's surface, which includes the soil zone. The unsaturated zone may contain water or moisture but in general is not conductive to ELF/SLF. Water in the unsaturated zone tends to be evaporated by solar energy or percolate through the unsaturated zone to join the groundwater in the unsaturated zone. The unsaturated zone near the Earth's surface serves as an energy sink, called Earth ground, that absorbs and dissipates electromagnetic energy at all frequencies making the unsaturated zone a poor conductor. In contrast, water in the hydrosphere is conductive to ELF/SLF electromagnetic energy and functions as an electromagnetic spherical antenna. This hydrosphere antenna has a polar circumference of about 24,860 miles and resonates at 7.83 Hz, which is known as the Schumann resonance. The hydrosphere antenna conducts broadband electromagnetic energy between 7.5 Hz and about 300 Hz and provides a natural wireless electric grid for transporting energy through the Earth without transmission lines. Global lightning return stroke current is sourced by the hydrosphere triggered by high voltage storm cloud conductivity. The hydrosphere antenna serves as a current source for the power receiver 10.

FIG. 1 illustrates an exemplary power receiver 10 according to one embodiment designed to extract energy from the hydrosphere. The power receiver 10 comprises a hydrosphere terminal 20, a resonant transformer 30, capacitor 40, a driver circuit 50 and a load 60. The resonant transformer 30 comprises an air core transformer that includes a primary coil L1 and a secondary coil L2 arranged as a step-up transformer. The driver circuit 50, such as a Slayer circuit, is powered by a DC power supply 52 and supplies an oscillating frequency to the primary coil L1 of the transformer 30. DC current flowing through the primary coil L1 of the transformer 30 creates a magnetic field. The secondary coil L2 converts the magnetic field generated by the primary coil L1 back into an AC current and steps it up to a much higher AC voltage.

The secondary coil L2 is connected at one end to the hydrosphere terminal 20 through capacitor 40 and at the other end to a load 60. The capacitor 40 isolates the secondary coil L2 from the hydrosphere terminal 20 so that the secondary coil L2 can freely oscillate to generate a high voltage and tunes the resonant frequency of the secondary coil L2. The top load 60 acts as a capacitor, greatly increasing the strength of the electromagnetic field, preventing the escape of energy so that a high AC voltage can be developed. The load 60 may comprise any energy consuming or energy storage device.

The driver circuit 50 and transformer 30 collectively form a self-tuning oscillator that that oscillates at the resonant frequency of the transformer 30. The voltage at the base of the secondary coil L2 is fed back to the driver circuit 50 to switch the DC current flowing through the primary coil L1 of the transformer 30. When the DC current is switched on, a rising current flows through the primary coil L1 and generates a magnetic field, which induces a rising voltage on the secondary coil L2. The load resists the voltage change, which causes a rising negative voltage at the bottom of the secondary coil L2, which is fed back to the driver circuit 50 and switches off the DC current flow in L1. When the DC current flow in L1 is switched off, the magnetic field generated by the primary coil L1 collapses and the voltage on the secondary coil L2 drops, switching the DC current back on, This process repeats indefinitely to generate a high AC voltage in the secondary coil L2.

As previously noted, the hydrosphere is a current source. The hydrosphere terminal 20 and transmission line 25 connect the secondary coil L2 of the resonant transformer 30 to the earth's hydrosphere. The hydrosphere terminal 20 and transmission line 25 are insulated from electrical ground, e.g., Earth ground or soil ground. The high AC voltage generated by the secondary coil L2 overcomes the inductance of the transmission line 25 connecting the secondary coil L2 to the hydrosphere terminal 20 and induces a current flow from the hydrosphere terminal 20 through the secondary coil L2 to the load 60 where the energy is consumed and/or stored. In this regard, the high voltage/oscillations of the secondary coil L2 caused by the driver circuit 50 function as a current pump to pump current from the hydrosphere. During each oscillation, current flows from the hydrosphere terminal 20 through the resonant transformer 30 to the load 60.

Figure 3:
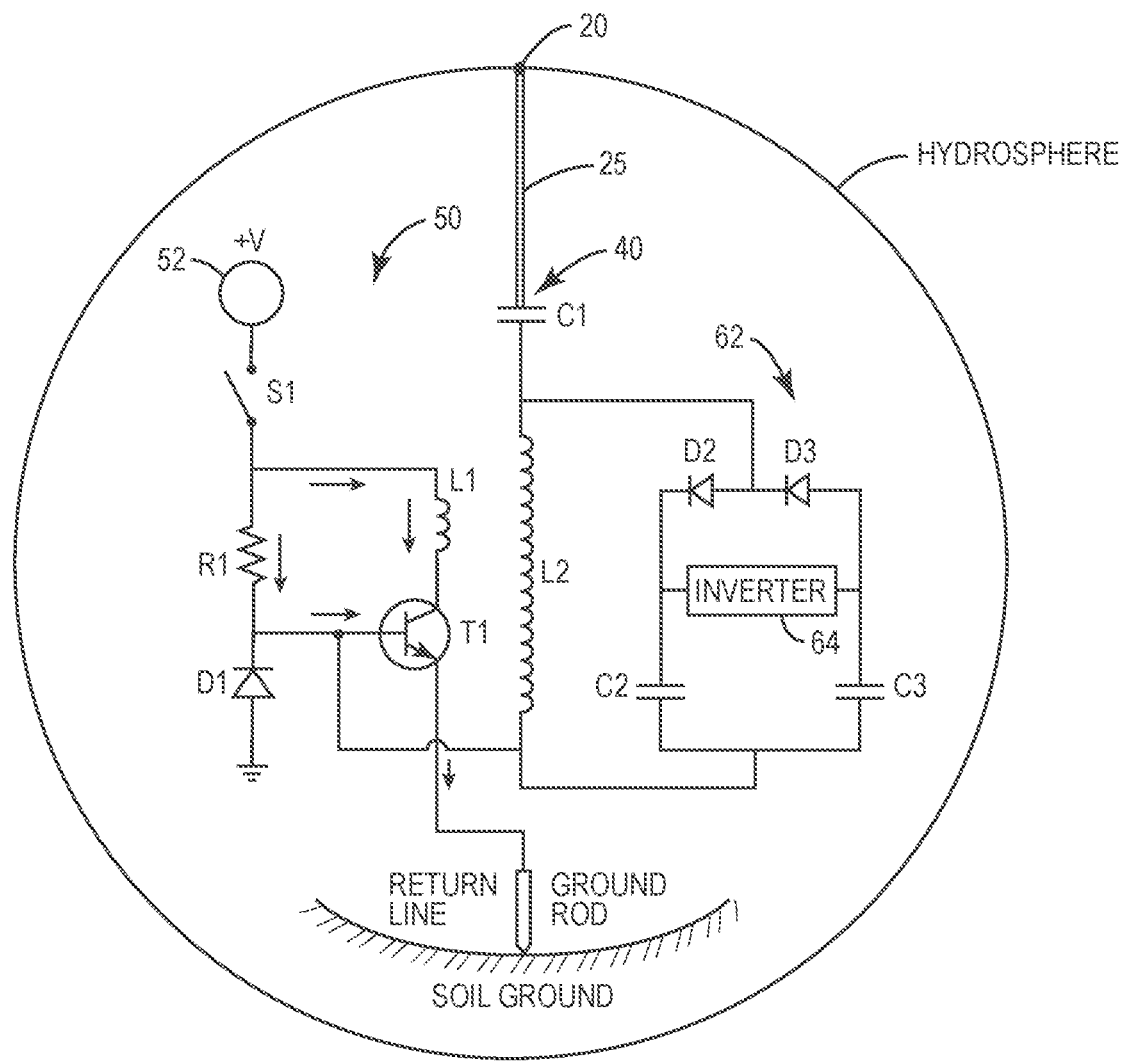
FIG. 3 is a detailed schematic of the power receiver according to the first embodiment.

FIG. 3 is a more detailed schematic of the power receiver 10 shown in FIG. 1. The power receiver 10 comprises a hydrosphere terminal 20, a resonant transformer 30 connected to a hydrosphere terminal 20 by a transmission line 25, a capacitor 40 connected in series with the secondary coil L2 of the transformer 30, a driver circuit 50 and a load 60 as previously described.

The hydrosphere terminal 20 comprises a grounding rod that is inserted into the earth's hydrosphere, preferably into a zone that is saturated by ground water, e.g., below the water table. In one embodiment, the grounding rod comprises a ⅝" copper-plated steel rod (UL467), such as the 7500K15 sold by McMaster-Carr, or copper tube. The grounding rod is tapered at one end for driving into the earth. The opposite end is externally threaded to provide for connection to the transmission line 25.

The transmission line 25 comprises a polyethylene coated copper tube with an outside diameter (O.D) of approximately ⅜ to ⅝ inches. Table 1 below lists exemplary copper tubing provided by McMaster-Carr that is suitable for use in a power receiver 10 as herein described. The capacitor 40 comprises a 450 volt 8200 μf capacitor.

TABLE 1

Tubing for transmission line

| OD | Wall Thick. | ID | Max. Pressure | Form | Temper Rating | Model # |
|---|---|---|---|---|---|---|
| ⅜" | 0.03" | 0.315" | 910 psi @ 72° F. | Coil | Soft | 3089K11 |
| ½" | 0.035" | 0.43" | 770 psi @ 72° F. | Coil | Soft | 3089K15 |
| ⅝" | 0.04" | 0.545" | 720 psi @ 72° F. | Coil | Soft | 3089K19 |

The resonant transformer 30 comprises an air core transformer that includes a primary coil L1 and a secondary coil L2 arranged as a step-up transformer. The coils L1, L2 wind in opposite directions. The transformer 30 is preferably designed to provide a voltage in the range of 3,000 to 10,000 volts. According to one embodiment, the transformer 30 is designed to step up from 12 volts DC to about 10,000 volts AC. The primary coil L1 comprises a flat coil with three turns spaced at ½ inch made with a ¼" O.D. copper tube, such as McMaster-Carr 8967K88. The secondary coil L2 comprises a coil with 443 turns on a 3.5 inch O.D. PVC tube made with #24 AWG magnetic wire.

The driver circuit 50 comprises a battery B1 serving as the power supply 52, a NPN transistor T1, a diode D1 and a resistor R1. The resistor R1 is connected in series between the base of the transistor T1 and the primary coil L1 of the transformer 30. The opposite end of the primary coil L1 is connected to the collector of the transistor T1 and the emitter of the transistor T1 is connected to ground. The diode D1 is connected between the base of the transistor T1 and ground. In one embodiment, the battery B1 comprises a 12 volt, 7 AH sealed lead acid (SLA) battery. The transistor T1 comprises a MJL21194 silicon power transistor, which is rated for 250 V, 16 A. The diode D1 comprises a fast switching ON 1N4148 diode. The resistor R1 comprises a 10 k ¼ watt carbon resistor.

The load 60 comprises an AC-to-DC converter 62 to convert the AC current from the secondary coil L2 to DC, which is supplied to the load 64. The AC-to-DC converter 62 includes two diodes D2, D3 and two capacitors C2 and C3 configured as an AV plug. The diodes D2, D3 rectify the AC current from the secondary coil L2 to produce a DC current. A portion of the energy is stored by capacitors C2 and C3, which can be used to supply power to an inverter 64. In one embodiment, the diodes D2, D3 comprise HVR 300 30 kV high speed diodes and the capacitors C2, C3 comprise 480 V, 100μ capacitors.

Figure 4:
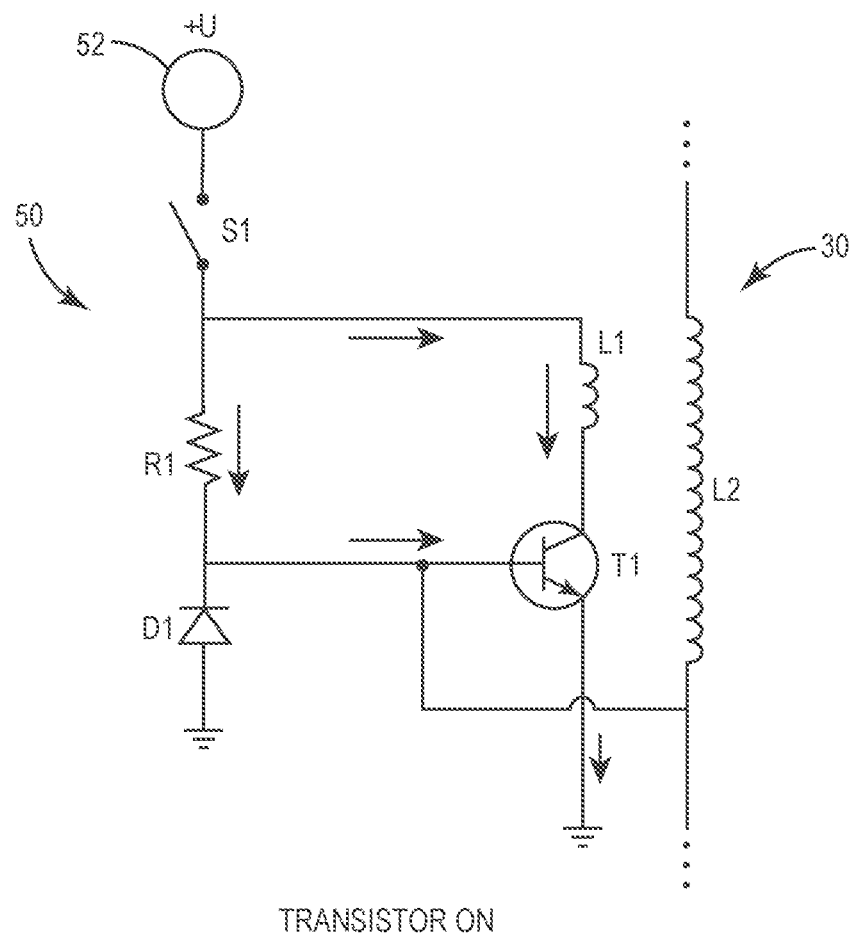
FIGS. 4 and 5 illustrates operation of the driver circuit in the power receiver.
Figure 5:
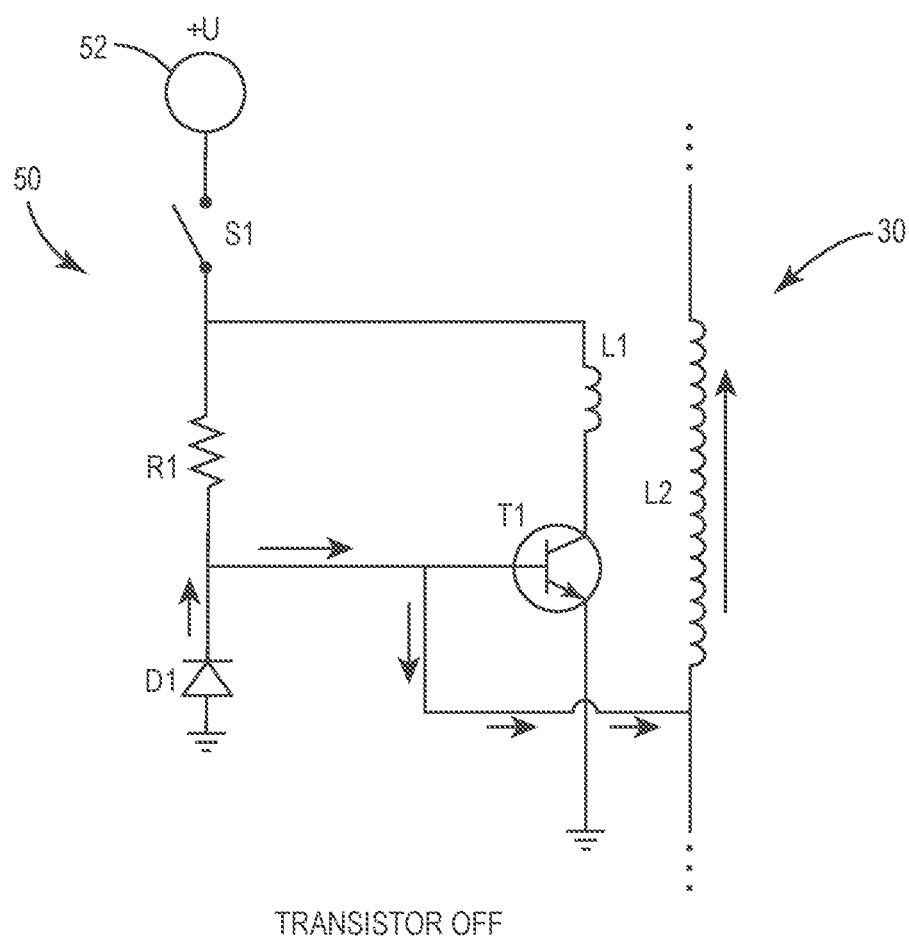

FIGS. 4 and 5 illustrate operation of the driver circuit 50. The transistor T1 in the driver circuit 50 functions as a switch to control the current flow though the primary coil L1. The switching of the transistor T1 is controlled by the feedback from the secondary coil L2. When the switch S1 of the driver circuit 50 is closed, a base-emitter current starts flowing through the transistor T1, which puts the transistor T1 in a minimum resistance state enabling current flow on the collector-emitter path. A rising current will start flowing from the battery 52 through the primary coil L1 and the collector-emitter path of the transistor T1 to ground as shown in FIG. 4. The rising current in the primary coil L1 creates a magnetic field and induces a rising voltage in the secondary coil L2. The load 60 resists the voltage change, which leads to a rising negative voltage at the bottom of L2. The voltage at the bottom of L2 is fed back to the driver circuit 50. The negative voltage at the base of the transistor T1 switches the transistor T1 to a maximum resistance state which shuts off current flow on the collector-emitter path. The current flow through the primary coil L1 rapidly decreases and the magnetic field created by L1 collapses. Also, when the negative voltage at the bottom of L2 is higher than the forward voltage of the diode D1, current will start to flow through the diode D2 to the secondary coil L2 causing the voltage on the secondary coil L2 to decrease as shown in FIG. 5. The decreasing voltage causes the transistor T1 to switch back to the minimum resistance state and the process repeats indefinitely.

Due to the feedback from the secondary coil L2, the circuit will self-tune to the resonant frequency of the transformer 30 and capacitor 40, producing a high voltage from the top of L2 to ground. In the exemplary embodiment, the circuit is configured so that the secondary coil L2 resonates at a frequency in the range of 500 KHz to 1.5 MH and produces a voltage of about 10 k volts. The high voltage on the secondary coil L2 induces a current flow from the hydrosphere terminal 20 through the secondary coil L2 to the load 60. Diodes D2 and D3 convert the high frequency AC current to DC current. The energy provided by the hydrosphere current can be stored in capacitors C2, C3. In one exemplary embodiment, the diodes D1, D2 and the capacitors C2, C3 are selected to provide a 380 volt, 20A DC power supply that can be used as input to a conventional solar panel inverter. The solar panel inverter 64 converts the DC power from the output circuit to AC power that is usable in a home or business (e.g., 110V, 60 Hz, AC).

Figure 6:
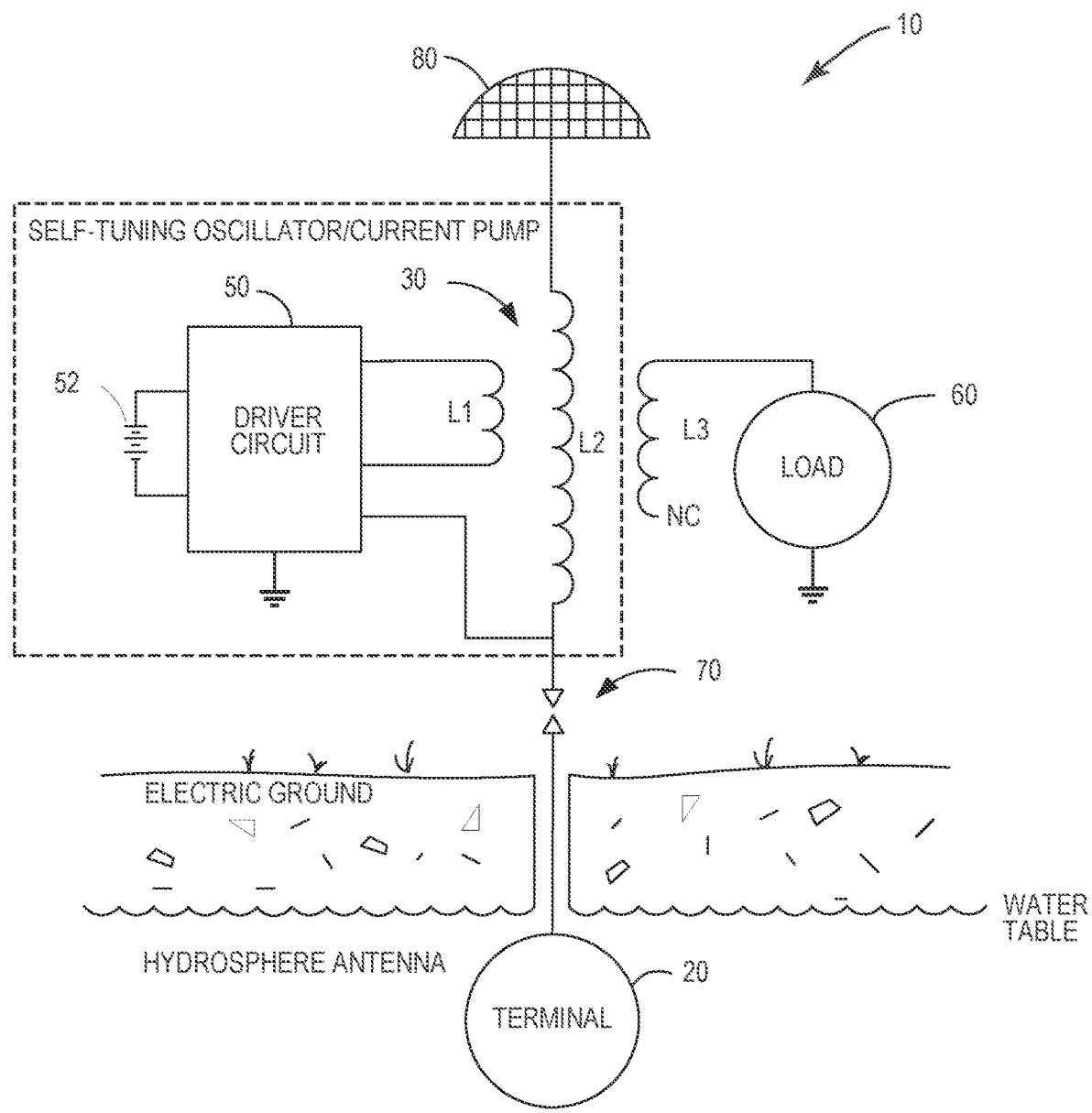
FIG. 6 is a schematic diagram of a power receiver according to a second embodiment.

FIG. 6 illustrates an exemplary power receiver 10 according to a second embodiment. The power receiver 10 comprises a hydrosphere terminal 20, a resonant transformer 30, a spark gap 70, a driver circuit 50, a top capacitance 80 and a load 60. The resonant transformer 30 comprises an air cored transformer that includes a primary coil L1 and a secondary coil L2 arranged as a step-up transformer. The coils L1, L2 wind in opposite directions. The driver circuit 50 incudes a DC power supply 52 and supplies a DC current to the primary coil L1 of the transformer 30. DC current flowing through the primary coil L1 of the transformer 30 creates a magnetic field. The secondary coil L2 converts the magnetic field generated by the primary coil L1 into an AC current and steps it up to a much higher voltage.

The secondary coil L2 is connected at one end to the hydrosphere terminal 20 through spark gap 70 and at the other end to an elevated terminal 80 that functions as a top hat capacitance 80. The spark gap 70 isolates the secondary coil L2 from the hydrosphere terminal 20 so that the secondary coil L2 can freely oscillate to generate a high voltage. The top hat capacitance provided by the elevated terminal 80 tunes the resonant frequency of the secondary coil L2 and increases the strength of the electromagnetic field, preventing the escape of energy so that a high AC voltage can be developed. The load 60 in this embodiment is capacitively coupled to the secondary coil L2 by coil L3 that is designed to step down the high voltage generated on the secondary coil. The stepped-down voltage is supplied to the load 60.

The driver circuit 50 and transformer 30, as previously described, collectively form a self-tuning oscillator that oscillates at the resonant frequency of the transformer 30. The voltage at the base of the secondary coil L2 is fed back to the driver circuit 50 to switch the DC current flowing through the primary coil L1 of the transformer 30. When the DC current is switched on, a rising current flows through the primary coil L1 and generates a magnetic field, which induces a rising voltage on the secondary coil L2. The top capacitance provided by the elevated terminal 80 and the load 60 resist the voltage change causing a rising negative voltage at the bottom of the secondary coil L2 that is fed back to the driver circuit 50 and switches off the DC current flow in L1. When the DC current flow in L1 is switched off, the magnetic field generated by the primary coil L1 collapses and the voltage on the secondary coil L2 drops. The decreasing voltage switches the DC current back on. This process repeats indefinitely to generate a high AC voltage in the secondary coil L2.

The hydrosphere terminal 20 and transmission line 25 connect the secondary coil L2 of the resonant transformer 30 to the earth's hydrosphere, which serves as a current source. The high AC voltage generated by the secondary coil L2 breaks down the dielectric in the spark gap 70 and converts the air in the spark gap 70 to conductive plasma causing a sudden release of energy from the hydrosphere similar to a lightning return stroke. The energy release manifests as a spark across the spark gap that forms a conductive path from the hydrosphere terminal 20 through the secondary coil L2 of the transformer 30 to the elevated terminal 80. The elevated terminal 80 is a conductive surface of large area and large radius of curvature with an insulated coating. The elevated terminal 80 suppresses coronal discharge, streamer discharge and electromagnetic discharge and provides leverage against which to pump ELF/SLF energy from the hydrosphere. In the absence of load 60, the electrical potential would boil off as corona or streamers. The current flow from the hydrosphere terminal 20 through the secondary coil L2 induces a current flow in L3, which supplies a low voltage AC power to the load 60.

Figure 7:
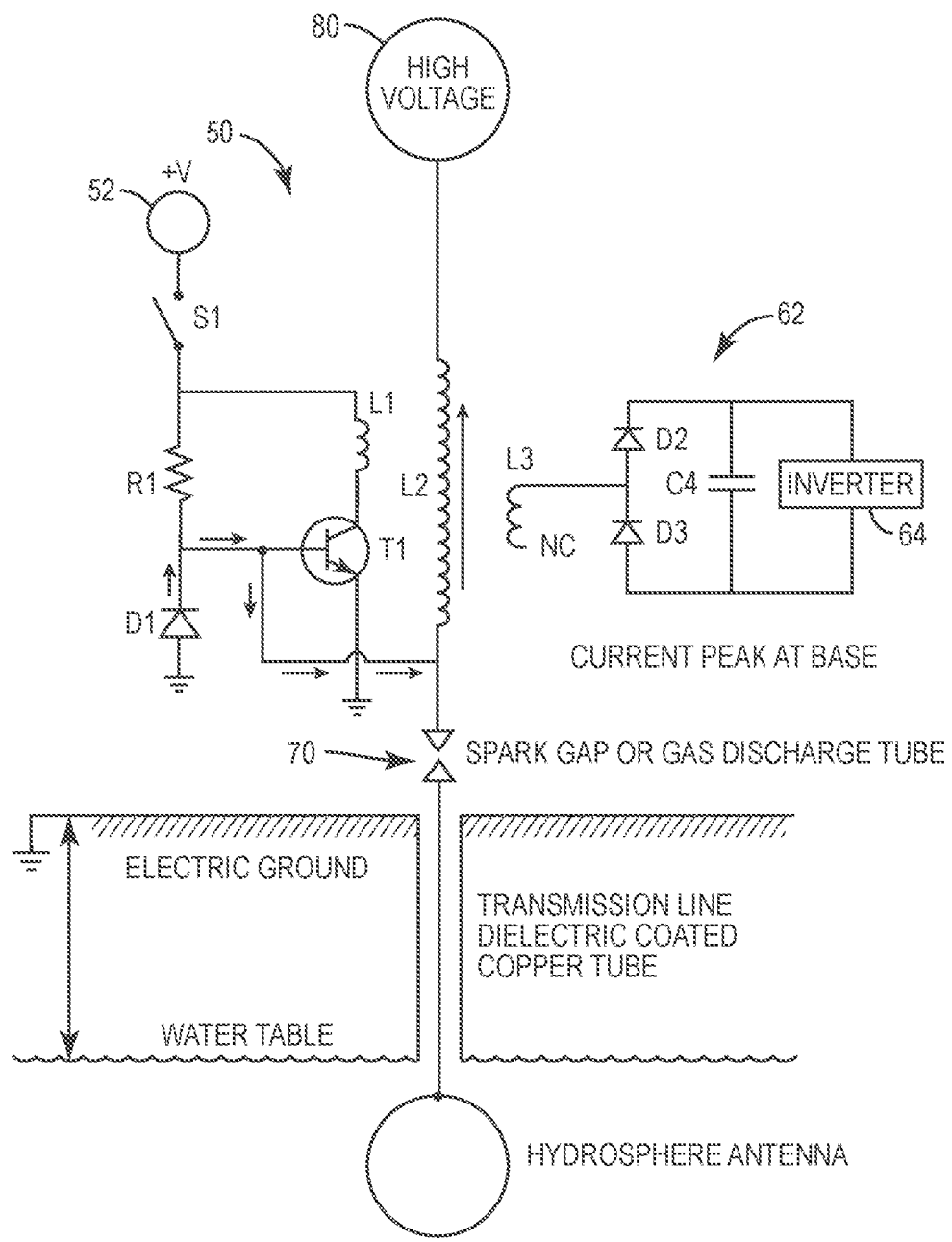
FIG. 7 is a detailed schematic of the power receiver according to the second embodiment.

FIG. 7 is a more detailed schematic of the power receiver 10 shown in FIG. 5. The power receiver 10 comprises a hydrosphere terminal 20, a resonant transformer 30 connected to a hydrosphere terminal 20 by a transmission line 25, a spark gap 70 connected in series with the secondary coil L2 of the transformer 30, a driver circuit 50, an elevated terminal 80 connected to the top end of the secondary coil L2, and a load 60. The transformer 30 (including coils L1 and L2), transmission line 25, hydrosphere terminal 20 and driver circuit 50 are the same as previously described and the description is therefore not repeated here.

In one embodiment, the spark gap 70 comprises two ferrite 2000u 2"×¾" rods separated by approximately ½" to spark at 60 Hz. The distance will vary depending on the operating voltage and the desired frequency of the spark. The spark gap 70 could, in some embodiments, be replaced by a gas discharge tube.

The purpose of the elevated terminal 80 is to prevent coronal discharge, streamer discharge and undesirable electromagnetic emissions. The elevated terminal 80 may comprise a full or partial sphere, a plate, a cylinder with hemispherical ends, or a toroid covered with an insulating material to provide an aerial capacity. In some embodiments, the elevated terminal 30 may comprises a sinusoidal coil or helical coil made with an insulated wire In the embodiment shown in FIG. 4, the elevated terminal 80 comprises a 8"×2" aluminum toroid elevated to provide a capacitor dielectric with respect to ground to prevent unwanted discharges.

The coil L3 is configured to step down the high voltage in the secondary coil L2 of the transformer to about 380 V AC. In one embodiment, the L3 coil comprises a coil with 5 turns made with #14 AWG 600 volt copper wire. One end of the coil L3 is connected to the load 60 and the opposite end is free.

The load 60, like the previous embodiment, comprises a AC-to-DC converter 62 and solar panel inverter 64. The AC-to-DC converter 62 in this embodiment comprise diodes D2 and D3 and capacitor C4 configured as an AV plug. Diodes D2 and D3 convert the high frequency AC current to DC current. The energy provided by the hydrosphere current can be stored in capacitor C4. The solar panel inverter 64 converts the DC power from the output circuit to AC power that is usable in a home or business (e.g., 110V, 60 Hz, AC). In one the exemplary embodiment, the diodes D1, D2 and capacitor C4 are selected to provide a 380 volt, 20A DC power supply that can be used as input to a conventional solar panel inverter. The diodes D1, D2 may, for example, comprise SB140 40V 1A Schottky diodes. The capacitor C4 may comprise a 480V, 100 μf capacitor.

Figure 8:
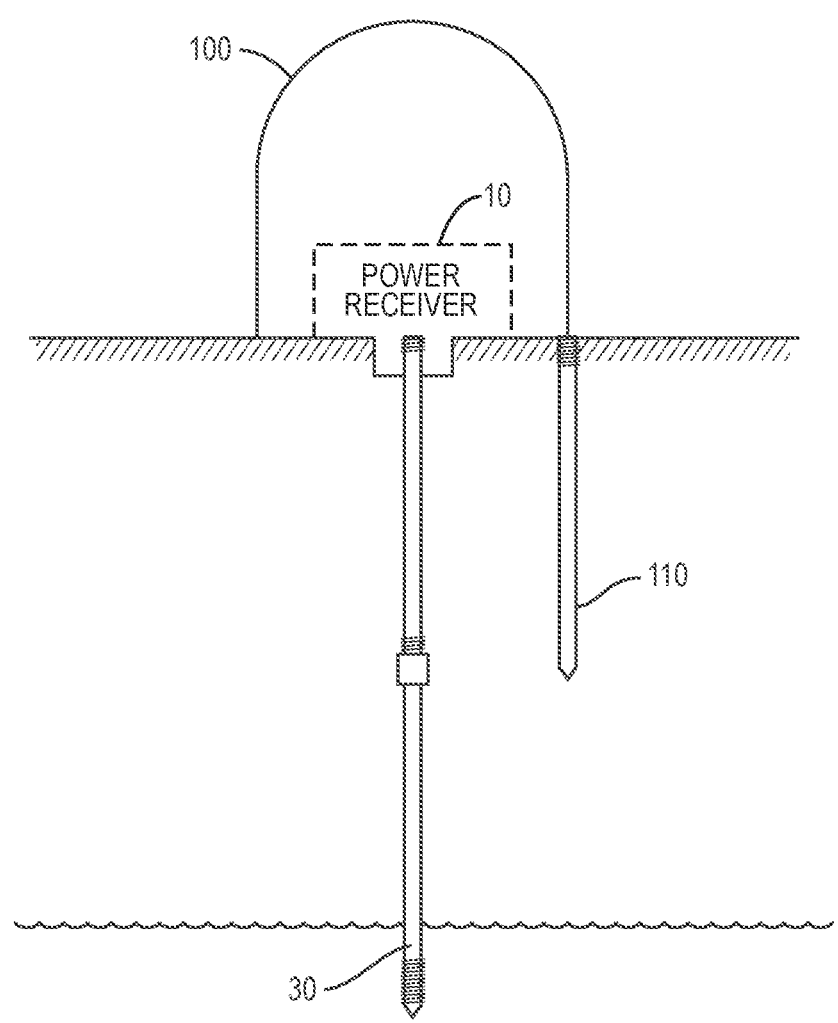
FIG. 8 is a schematic diagram illustrating a typical deployment of the power receiver.

FIG. 8 schematically illustrates an exemplary deployment of the power receiver. The power receiver 10 is contained within a protective housing 100 to protect against lightening strikes. The housing 100 may comprise a metallic shell with a large radius of curvature. The power receiver 10 is connected to the hydrosphere terminal 20 by a transmission line 25 as previously described. The transmission line 25 is electrically insulated from the electrical ground, e.g. Earth ground or soil ground. The housing 100 is grounded to the earth ground by a grounding rod 110. In one embodiment, the grounding rod 110 comprises a ⅝" copper-pated steel rod (UL467), such as the 7500K15 sold by McMaster-Carr, or copper tube. The grounding rod 110 is tapered at one end for driving into the earth. The opposite end is externally threaded to provide for connection to the housing 100. The housing 100 may, for example, comprise a Faraday cage as described in U.S. patent application Ser. No. 16/084,149 filed on Sep. 11, 2018 entitled "Power Receiver Including Faraday Cage for Extracting Power from Electric Field Energy in the Earth", which is incorporated herein in its entirety by reference.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A power receiver for extracting electrical energy using the earth's hydrosphere antenna, the power receiver comprising:
    a hydrosphere terminal configured for insertion in the Earth's hydrosphere;
    a resonant transformer connected to hydrosphere terminal by a transmission line, wherein the transmission line is insulated from electrical ground; and
    a driver circuit connected to a primary winding of the resonant transformer to generate a high voltage alternating current in a secondary winding of the resonant transformer to induce current flow from the hydrosphere through the resonant transformer.

2. The power receiver of claim 1 wherein the resonant transformer and driver circuit are configured as a self-tuning oscillator.

3. The power receiver of claim 2 wherein the resonant transformer and driver circuit comprise a Slayer circuit.

4. The power receiver of claim 1 further comprising a capacitor connected in series between the hydrosphere terminal and the resonant transformer.

5. The power receiver of claim 1 further comprising a spark gap connected in series between the hydrosphere terminal and the secondary winding of the resonant transformer.

6. The power receiver of claim 1 further comprising a gas discharge tube connected in series between the hydrosphere terminal and the secondary winding of the resonant transformer.

7. The power receiver of claim 5 further comprising an elevated terminal connected to the secondary winding of the resonant transformer providing an aerial capacitance.

8. The power receiver of claim 1 further comprising an AC-to-DC converter electrically coupled to a secondary winding of the resonant transformer to convert AC power in the secondary winding to DC power.

9. The power receiver of claim 8 wherein the AC-to-DC converter is inductively coupled to the secondary winding of the resonant transformer.

10. The power receiver of claim 9 further comprising one or more load capacitors to store energy extracted from the hydrosphere.

11. The power receiver of claim 8 further comprising an inverter electrically connected to the AC-to-DC converter for converting the DC energy to a useful form for home or business use.

12. A power receiver for extracting electrical energy from the earth's hydrosphere, the power receiver comprising:
    a hydrosphere terminal configured for insertion in the hydrosphere and insulated from an electrical ground;
    a resonant transformer connected to hydrosphere terminal via a spark gap that isolates the resonant transformer from the hydrosphere terminal in a gaseous state and connects the resonant transformer to the hydrosphere terminal in a plasma state; and
    a driver circuit connected to a primary winding of the resonant transformer to generate a high voltage alternating current in a secondary winding of the resonant transformer to induce an electrical spark across the spark gap.

13. The power receiver of claim 12 wherein the resonant transformer and driver circuit are configured as a self-tuning oscillator.

14. The power receiver of claim 13 wherein the resonant transformer and driver circuit comprise a Slayer circuit.

15. The power receiver of claim 12 further comprising an elevated terminal connected to the secondary winding of the resonant transformer providing an aerial capacitance.

16. The power receiver of claim 12 further comprising an AC-to-DC converter electrically coupled to a secondary winding of the resonant transformer to convert AC power in the secondary winding to DC power.

17. The power receiver of claim 16 wherein the AC-to-DC converter is inductively coupled to the secondary winding of the resonant transformer.

18. The power receiver of claim 17 further comprising one or more load capacitors to store energy extracted from the hydrosphere.

19. The power receiver of claim 16 further comprising an inverter electrically connected to the AC-to-DC converter for converting the DC energy to a useful form for home or business use.

20. A method of extracting energy from the Earth's hydrosphere, the method comprising:
    electrically coupling a secondary winding of a resonant transformer to a hydrosphere terminal inserted into the Earth's hydrosphere;
    electrically insulating the connection between the hydrosphere terminal and resonant transformer from earth ground;
    applying a drive signal to the resonant transformer to cause the resonant transformer to oscillate; and
    generating a high voltage in the secondary winding of the resonant transformer to induce the flow of current from the hydrosphere to the resonant circuit.

21. The method of claim 20 further comprising connecting a capacitor in series between the hydrosphere terminal and the resonant transformer.

22. The method of claim 20 further comprising connecting a spark gap connected in series between the hydrosphere terminal and the secondary winding of the resonant transformer.

23. The method of claim 22 further comprising configuring the spark gap to ignite at a frequency of about 60 Hz.

24. The method of claim 20 further comprising connecting an elevated terminal to the secondary winding of the resonant transformer to provide an aerial capacitance.

25. The method of claim 20 further comprising electrically coupled a AC-to-DC converter to a secondary winding of the resonant transformer to convert AC power in the secondary winding to DC power.

26. The method of claim 20 further comprising inductively coupling the AC-to-DC converter to the secondary winding of the resonant transformer.

27. The method of claim 20 further comprising storing energy extracted from the hydrosphere in one or more load capacitors.

28. The power receiver of claim 8 further comprising an inverter electrically connected to the AC-to-DC converter for converting the DC energy to a useful form for home or business use.

* * * * *